Nov. 10, 1970  R. G. KAISER  3,538,680
PAPERMAKING APPARATUS AND PROCESS
Filed Dec. 29, 1967  9 Sheets-Sheet 1

Nov. 10, 1970     R. G. KAISER     3,538,680

PAPERMAKING APPARATUS AND PROCESS

Filed Dec. 29, 1967     9 Sheets-Sheet 7

# United States Patent Office 3,538,680
Patented Nov. 10, 1970

3,538,680
PAPERMAKING APPARATUS AND PROCESS
Robert G. Kaiser, Hohokus, N.J., assignor to Clark & Vicario Corporation, North Tarrytown, N.Y., a corporation of New York
Filed Dec. 29, 1967, Ser. No. 694,494
Int. Cl. B01d 19/00
U.S. Cl. 55—41                        27 Claims

ABSTRACT OF THE DISCLOSURE

Apparatus for deaeration of an air-containing aqueous suspension of papermaking stock in which the stock is atomizingly introduced into deaerating chambers extending from a stock receiver and communicating with the interior thereof, the deaerating chambers and receiver being maintained under vacuum. Cleaners may also be employed in advance of the deaerating chambers, and the considerably shorter accepts pipes leading from the cleaners to the chambers contribute substantially to cleaning efficiency.

BACKGROUND OF THE INVENTION

This invention relates to apparatus and method for treating suspensions. More particularly, it relates to apparatus and method for deaerating suspensions such as aqueous suspension of papermaking stock, which may also be classified or cleaned.

In the papermaking art, the advantages of deaerating the aqueous suspension of papermaking fiber prior to its delivery to the headbox or other point of use are well established. United States Pats. Nos. 1,853,849, 2,571,219, 2,614,656, 2,685,937, 2,642,950, 2,751,031 and 3,131,117 disclose apparatus and method for accomplishing such deaeration. The papermaking stock may also be classified into a dirt-poor fraction (known in the art as the "accepts" fraction) and a dirt-rich fraction (known in the art as the "rejects" fraction), either before or after deaeration, suitably through employment of centrifugal suspended solids separating means, hereinafter referred to as "cleaners," of which hydrocyclones are exemplary. Illustrative patents disclosing apparatus and method for combining cleaning and deaeration include United States Pats. Nos. 2,717,536 2,931,503, 2,876,860 and 3,206,917.

In various of the prior art patents there is disclosed an enclosed tank or receiver maintained under vacuum, into which the suspension to be deaerated is sprayingly or atomizingly discharged, whereby absorbed, adsorbed, entrained and dissolved air is removed from the fiber and other constituents of the suspension and the liquid vehicle, which is commonly water. Desirably, a pond of deaerated suspension may be collected in the receiver and deaerated suspension withdrawn from the pond and conveyed to the headbox of the papermaking machine or other point of use. The level of the pond is advantageously kept constant to provide a uniform hydrostatic head, and this may be accomplished by any of the means shown in the prior art, that of Pat. No. 3,206,917 being preferred.

Where cleaning of the stock is also accomplished, it is advantageous that cleaning precede or accompany deaeration. A plurality of cleaning stages may be used, the rejects fraction from the first or primary cleaning stage being further processed in a secondary cleaning stage to recover usable fiber, and secondary rejects may be further processed in a tertiary cleaning stage. The rejects fractions are commonly diluted to suitable consistency before further processing, white water from the wire pit being satisfactory for this purpose. Additional cleaning stages may also be employed. While the various cleaning stages are thus connected in series, each stage may include a plurality of cleaners connected in parallel, fewer cleaners being employed in subsequent stages by reason of the lesser volume of material to be processed.

In some embodiments only the accepts fraction from the primary cleaning stage is deaerated, but in other embodiments the accepts fraction from some or all of the cleaning stages subsequent to the primary stage may also be deaeratingly discharged into a zone of vacuum, e.g., into the receiver, as disclosed in commonly assigned United States patent application Ser. No. 417,161, filed Dec. 9, 1964 now United States Pat. No. 3,432,036.

The aqueous suspension of stock is supplied to the cleaners with sufficient force to expel a dirt-poor or accepts fraction from the base or accepts outlets and a dirt-rich or rejects fraction from the apex or rejects outlets. The accepts fraction emerges from each cleaner as a whirling annulus surrounding a liquid-free core and, if conveyed from each accepts outlet by an individual conduit (known in the art as an "accepts pipe" or "inlet pipe"), constructed as an extension of the vortex finder isolating the annulus of acceptable stock from the tangentially entering stream of suspension to be cleaned, the accepts fraction emerges from the terminus of each inlet pipe as a spray. Frictional forces or obstructions can lead to collapse of the annulus, as does the combining of two or more such discharges into a common conduit or discharge to a liquid-filled conduit. In practice, the force with which stock is fed to the cleaners is sufficient to overcome frictional forces and gravity, and the accepts fraction emerges from the terminus of each inlet pipe as a spray, each such terminus being located above the level of any liquid accumulated in the discharge zone.

Conventionally, the vacuum-influenced receiver comprises a cylindrical tank. When such deaeration apparatus is employed on papermaking machines of large capacity, a correspondingly large receiver is needed to make adequate provision for the volume and rate of stock required. The modern trend is toward greatly increased papermaking machine speeds, which in turn requires a great volume or rate of furnish of papermaking stock to the machine and dictates a corresponding increase in size of the receiver and amount of associated equipment. Similarly, where cleaning is also employed, the dimensions of the receiver must be adequate to accommodate the requisite number of cleaners. And provision for discharge of secondary accepts (and the accepts from subsequent cleaning stages) into the receiver, as described in the aforementioned application Ser. No. 417,161, also increases the necessary length and size of the vessel.

As a result, the dimensions of the receivers employed in such systems have continually grown, and in the present state of the art cylindrical receivers 8 feet in diameted and 73 feet in length have been used. It is readily apparent that the necessity of using receivers of such size creates a number of problems, including fabrication, shipping, supporting means and location of the equipment, for such system are generally installed in existing mills which frequently do not have readily available space for equipment of such dimensions. Moreover, the receiver is desirably installed in an elevated position, the elevation desirably being sufficient to provide a barometric dropleg of at least about 34 feet from the surface of the pond deaerated stock in the receiver to the surface of the white water in the wire pit. Even greater elevation may be provided so that the deaerated stock may flow from the pond in the receiver to the headbox without the employment of intermediate pumping means, while overcoming the effect of the very high vacuum maintained in the receiver, as shown in copending application Ser. No. 526,256 filed Feb. 9, 1966.

Provision of increased system capacity requires commensurate increase in system deaerating capability and more specifically the space in the receiver wherein deaerating occurs. Furthermore, greater system capacity generally requires greater receiver pond collecting space. In consequence of enlarging receiver size to meet these requirements, the length of the inlet pipes extending into the receiver from the accepts outlets of the cleaners must be increased. Greater frictional forces are accordingly encountered by the whirling accepts annulus in the inlet pipes, necessitating an increase in the pressure with which stock is supplied to the cleaners and in the horsepower rating of the pump to insure that sufficient energy is imparted to enable the whirling annulus to pass through the greater inlet pipe length without collapse. The whirling annulus should have sufficient energy to pass through the inlet pipe and to break up as a forceful spray at the terminus of the inlet pipe for impact with the receiver upper inner surface to promote deaeration and overall cleaning efficiency. Thus, increases in receiver and system capacity have imposed additional power requirements, even where cleaners are not employed. And where cleaners are used, their efficiency is lower at the higher inlet pressures required by reason of the longer inlet pipes.

Receivers of increased dimension containing a larger pond of deaerated stock also require a heavier receiver structure and reinforced receiver supporting means, which in turn entail increased installation cost and consume more space in the mill. A larger pond also results in a less rapid turnover of stock collected therein and thus increases residence or retention time of stock in the pond. Areas of lower flow velocity within the pond can result and may afford opportunity for settling of the fiber and other constituents of the furnish, such as filler, thereby detracting from uniformity of the furnish supplied to the headbox or other point of use.

A further disadvantage of the larger pond of deaerated stock maintained in the receiver is the longer time required to alter or correct changes in consisting of furnish to the headbox. The grade or basis weight of paper being made on the machine is affected by adjustment of the papermaker's valve in the line from the pond of deaerated stock in the receiver to the headbox, thereby altering the consistency of the furnish to the machine. With a larger pond of stock in the receiver, a correspondingly longer time is required to reach equilibrium at the desired consistency and a larger amount of unsuitable paper or broke is consequently made, to the detriment of efficiency and economy. Similar, changes in the character of the pulp or other ingredients being employed may require compensatory adjustment of consistency and the time required to reach the desired equilibrium state is lengthened by reason of the large volume of deaerated stock in the deaeration system. Rapid changeover of grade or rapid correction or adjustment of consistency is always desirable, and the need therefor is becoming more acute with the trend to computerized operation of papermaking machines. It is not uncommon to experienece changes in grade as often as 10 to 20 times a day, and adjustments to accommodate differing stock characteristics can be as frequent. It will be appreciated that in such circumstances many tons of broke can result by reason of the time required to effect the desired equilibrium conditions, at modern papermaking machine speeds.

Of particular importance is the performance of the deaeration system during shutdown of the papermaking machine, as for repair or replacement of the wire, the felts, or other equipment. If the deaeration system and associated equipment are not maintained in operation at such times, settling of fibers and other ingredients from suspension can occur and it becomes necessary to reestablish uniform stock consistency and equilibrium conditions following start-up. Loss of production time and production of considerable broke can result. It is thus deesirable to provide overflow or recycle means of suitable capacity, so that the deaeration system can be kept in operation during such periods of papermaking interruption, thus avoiding settling and attendant problems. Provision of substantial overflow capacity is an important feature and has the additional attribute of permitting accommodation of a greater range and variety of grades and basis weights of paper which can be made on a given machine.

Each of the problems and circumstances just described is solved or ameliorated by the present invention, as will be apparent from the description which follows.

SUMMARY OF THE INVENTION

In accordance with the present invention, a stock receiver, which is preferably equipped with means to maintain a pond of deaerated stock collected therein at essentially constant level, is provided with a plurality of deaerating chambers extending outwardly from the receiver. The chambers preferably slope downwardly toward the receiver to facilitate flow or drainage of deaerated stock from each chamber into the body of the receiver. The deaerating chambers are generally constituted by elongated structures or wings enclosing spaces of predetermined configuration. Stock to be deaerated is sprayed or atomizingly admitted into the wings, which are maintained under vacuum sufficient to deaerate the stock, the deaerated stock flowing from the wings into the body of the receiver, and preferably collecting as a pond therein.

In accordance with the invention, the deaerating chambers or wings can have various configurations, the dimensions and number of wings actually used being determined by site space limitations and required volumetric capacity. The wings are joined to the receiver in air-excluding relationship at suitable points on the receiver body which permit drainage of deaerated stock from each wing into the receiver. As the stock to be deaerated is sprayed into the wings, the configuration of each wing and the location of its connection to the receiver is such as to preclude submergency of the stock inlets, i.e., deaerated stock draining from the wing into the receiver must not rise above the level of the stock inlet pipes, lest the spraying action be interfered with. To this end, it is preferred, although not essential, that the lowermost point of juncture between any wing and the receiver not be appreciably below the level of the pond of deaerated stock collected in the receiver.

It is also preferred that the liquid-free space above the pond in the receiver communicate with the liquid-free space in the several wings, and the necessary deaerating vacuum in the wings can thus be provided by suitable evacuating means connected with the upper portion of the receiver. Optionally or alternatively, evacuating means may be connected with the upper portion of each deaerating wing.

The manner of introducing stock to the wings may include the discharge of stock directly from individual inlet pipes extending from each accepts outlet of cleaners, or if cleaners are not employed suitable spray nozzle means may be fitted to inlet pipes extending into the wings. Where cleaners are used, their number and arrangement is selected according to cleaning and volume requirements at hand, and a suitable number of wings is provided to accommodate them.

The wing arrangement of the present invention permits the use of a greater number of cleaners in the overall system than has heretofore been possible for a given size of stock receiver, and also enables use of a shorter inlet pipe from the accepts outlets of the cleaners to the deaerating zone.

The inlet pipes can also be of uniform length, thereby providing uniformity of cleaner characteristics and promoting uniformity of cleaner characteristics and promoting uniformity of cleaninfi, in contrast to the prior art employment of inlet pipes of differing lengths extending from the various banks of cleaners mounted on the deaerating receiver. The wing arrangement also permits employed of smaller cleaners having a greater cleaning efficiency. Use of smaller cleaners entails employment of a greater number of cleaners, which in turn requires considerably more space for mounting them. The deaeration system of the prior art would have to be lengthened or broadened to accommodate an increased number of cleaners, while the system of the present invention through provision of an adequate number of wings of suitable dimension avoids the consequence of having a cumbersome, heavy tank of exceedingly large dimension. As a result, the present invention increases both system efficiency and capacity.

The receiver in a preferred embodiment is also provided with the pond level control means described in U.S. Pat. 3,206,917 and is accordingly provided with a weir defining one boundary of the pond of deaerated stock collected therein. In such event, where a plurality of cleaning stages is employed, the accepts fractions from those cleaning stages subsequent to the primary cleaning stage which are not regarded as suitable for papermaking may be conveyed to the overflow side of the weir in the receiver, suitably by means of additional wings similar to the primary wings from which deaerated stock flows to the pond in the receiver. Thus in one embodiment a plurality of primary wings, in which accepts from the primary cleaning stage are deaerated, communicate with that portion of the receiver in which a pond of primary deaerated stock is maintained, and a lesser number of secondary wings communicate with the receiver on the side of the weir opposite the pond. Tertiary and subsequent stage wings may also communicate with the receiver on the overflow side of the weir in a fashion akin to that of the secondary wings.

The invention accordingly comprises the several steps and the relation of one or more of such steps with respect to each of the others, and the apparatus embodying features of construction, combination of elements and arrangement of parts, all as exemplified in the following detailed disclosure.

DESCRIPTION OF THE DRAWINGS

For a further understanding of the nature and objects of the invention, reference should be had to the following detailed description taken in conjunction with the accompanying drawings, in which.

Throughout the description, like reference numerals are used to denote like parts in the drawings.

DETAILED DESCRIPTION

The present invention is concerned with improvements in papermaking machinery systems. The improvements may be embodied in original installations or existing systems can be modified to incorporate the improvements therein and the following description should be understood accordingly.

Figure 1:
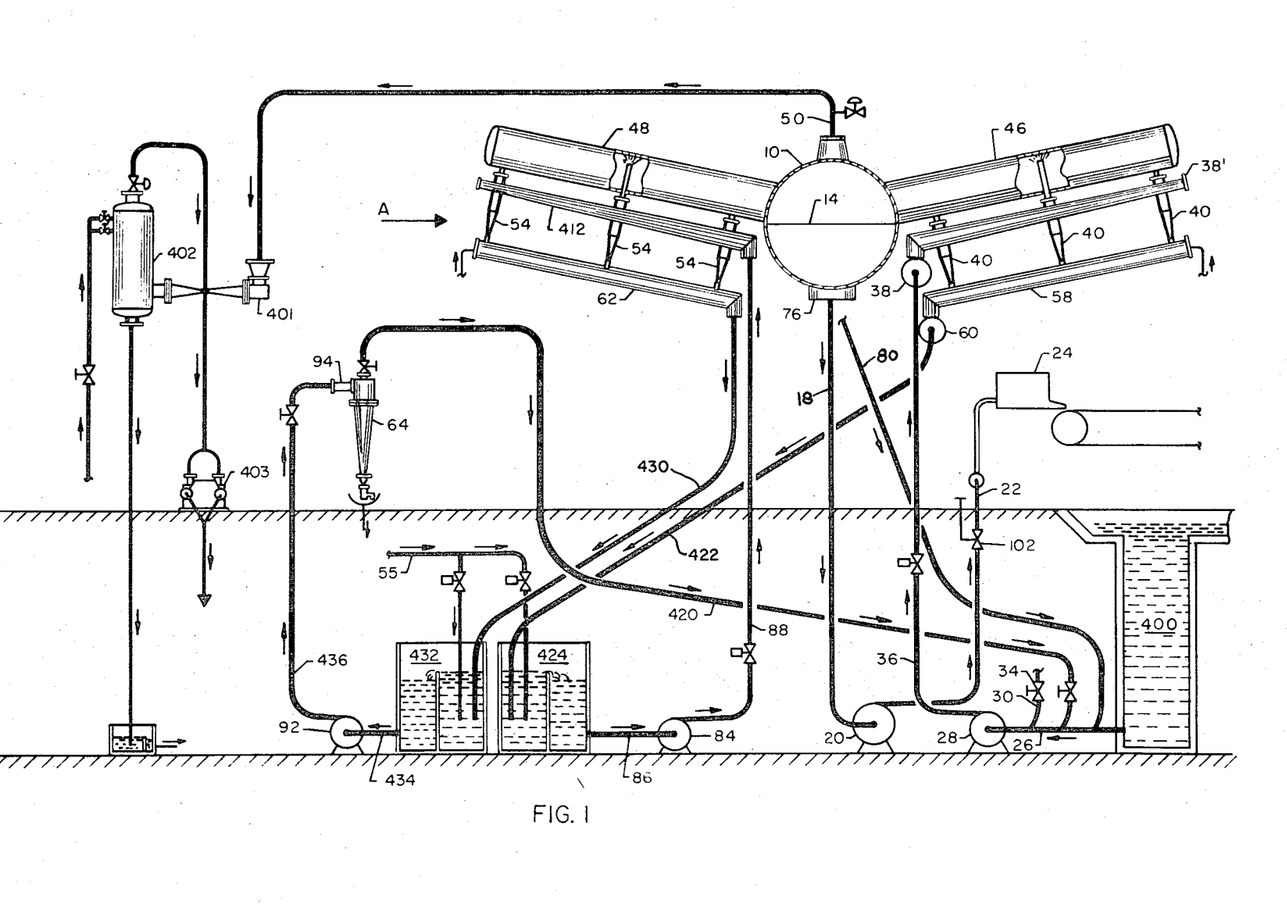
FIG. 1 is a schematic representation of one form of apparatus for treating a suspension in accordance with the present invention, the stock receiver being viewed in the direction of its major axis with the head removed, portions of the wings being shown in section.
Figure 2:
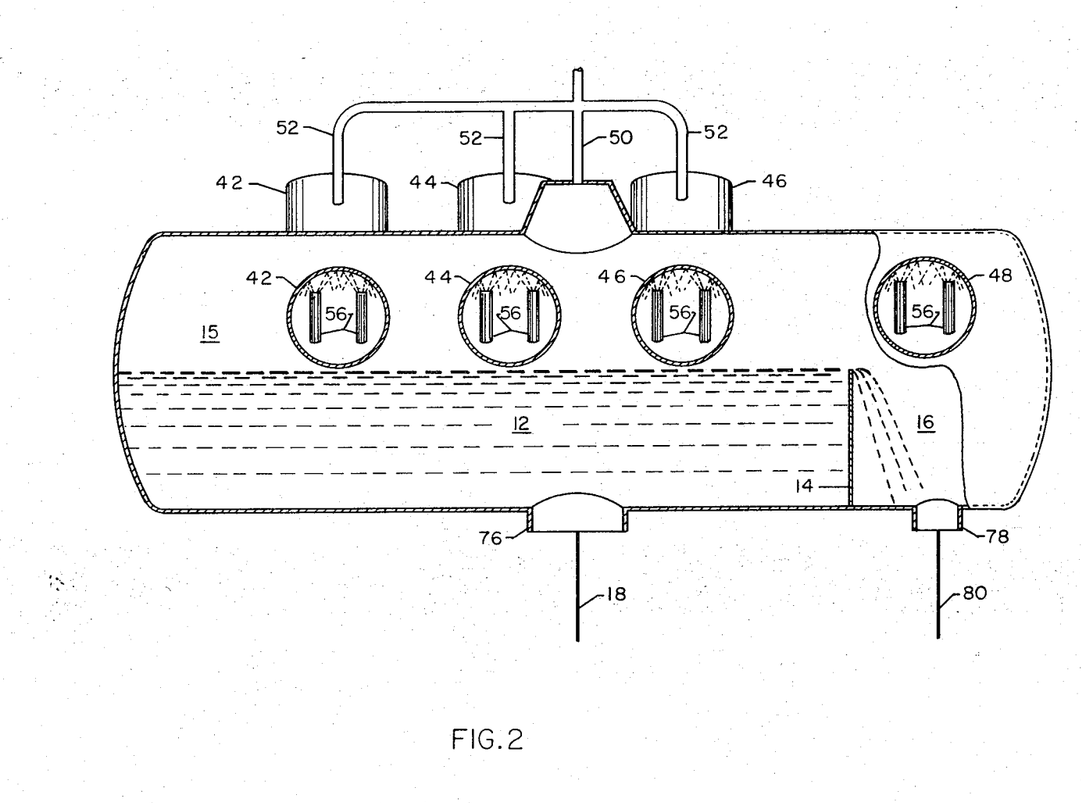
FIG. 2 is a partial schematic representation of the apparatus shown in FIG. 1 as viewed in the direction of arrow A of that figure, certain portions of the apparatus being removed or shown broken away for purposes of clarity of illustration.

The system illustrated in FIGS. 1 and 2 of the drawings includes a receiver 10, shown as generally cylindrical, but which may have any desired configuration. Assuming for purposes of illustration and example a deaeration system capable of supplying about 37,000 gallons per minute of deaerated stock to a papermaking machine, receiver 10 may have a 10-foot diameter and be 15 feet long, the major axis of the receiver being disposed horizontally as shown. The receiver interior is divided into a first larger zone or compartment 15 wherein a pond 12 of deaerated stock may be collected, the elevation of the surface of the pond being generally defined by a weir 14 extending transversely of the receiver major axis and serving additionally to define a second, smaller overflow compartment or zone 16 which receives stock overflowing from the first compartment when the pond therein rises above a predetermined level as defined by the height of the weir 14. The weir may be vertical or sloped, and may suitably be located to provide an overflow compartment 16 of about 3½ feet in length, as measured along the major axis of the receiver. The advantages attending the use of weir 14 are more fully described in U.S. Pat. 3,206,917, to which reference is made for that purpose.

Deaerated stock collected as a pond in the receiver is removed therefrom through conduit 18, which is shown as conveying the stock to pump means 20, whence the stock is pumped through conduit 22 as furnish to the headbox 24 of the papermaking machine. Alternatively, if the elevation of the receiver 10 with respect to headbox 24 is sufficient, intervening pump 20 may be dispensed with, as shown in the aforementioned application Ser. No. 526,256.

Dilution water, suitably white water from the wire pit 400, is drawn through conduit 26 by pump means 28, which also draws new papermaking stock (thick stuff) through conduit 30 from a stock preparation chest or other fresh stock source (not shown) in a proportion determined by the setting of suitable regulation means such as valve 34, the diluted stock discharged from pump means 28 being delivered through conduit 36 to a primary cleaning stage header 38 (shown in FIG. 1). Header 38 is provided with a number of laterally extending branches 38' through which the stock suspension is delivered to the cleaners 40 making up the primary cleaning stage. The papermaking stock entering header 38 contains substantial quantities of air contained in the fiber and in the aqueous vehicle, as well as foreign body solids generally termed "dirt." Both the "dirt" and air are desirably removed from the stock prior to its delivery to the headbox; but it is to be understood that this invention is not restricted to embodiments employing cleaners and that spray nozzles or other atomizing means may be substituted in their stead.

In contrast to prior systems wherein removal of air from the stock suspension has been accomplished wholly within the stock receiver, the apparatus of the present invention does not require employment of the stock receiver as a deaerating device and hence the size of the stock receiver can be decreased, or for a given receiver size the system capacity can be very substantially increased. This is achieved by providing a number of deaerating chambers in which deaeration of the stock occurs, the deaerating chambers being constituted by a plurality of enclosures or wings 42, 44, 46 and 48 extending outwardly from the receiver, each chamber being in communication with the interior of the stock receiver and being maintained under vacuum sufficient to effect deaeration of stock suspension sprayed thereinto, the vacuum in the receiver and wings being of substantially equal value. Vacuum-maintaining means, such as a booster ejector 401, condenser 402, and vacuum pump 403 may be connected with the interior of the receiver 10 by means of a main vacuum conduit 50 or, either optionally or alternatively, with each of the wings as by means of branch conduits 52 as shown in FIG. 2, the degree of vacuum within the system desirably being as prescribed in U.S. Pat. 2,614,656.

Wings 42, 44 and 46 are connected with the accepts outlets of the primary cleaning stage and will be referred to herein as "primary" wings. The primary wings, as best seen in FIG. 2 are arranged on the receiver so as to outflow to the pond 12, and are accordingly fixed or converted to the receiver shell structure at axial locations spaced within the longitudinal expanse of pond 12. Wing 48 is a "secondary" wing and is connected with the accepts outlets of a secondary cleaning stage, its outflow being to overflow compartment 16. The respective wings receive the accepts or dirt-poor suspension from the respective cleaning stages and in some embodiments, as where secondary accepts are sufficiently clean to be used for papermaking, the secondary wing or wings may be arranged to outflow to pond 12. Tertiary and subsequent stage wings, if employed, may also outflow into the receiver, and will normally do so on the overflow side of weir 14 into compartment 16, as such subsequent stage accepts or cleaned fractions are not normally sufficiently free of contaminants to be used as furnish to the papermaking machine.

Alternatively, as shown in FIG. 3, the tertiary (and subsequent cleaning stage) accepts may be discharged into the rejects header of a preceding cleaning stage, such as primary rejects header 410, and thence flow to a subsequent cleaning stage, such as the secondary cleaning stage.

The introduction of the stock into the deaerating chambers or wings as shown is effected by the cleaners, suitably centrifugal solids separating means such as hydrocyclones 40 in the case of the primary wings and 54 in the case of secondary wing 48. As will be discerned from FIG. 2, the hydrocyclones 40 and 54 can be arranged in pairs at laterally spaced locations along the length of the wings, the accepts outlets of the hydrocyclones being connected to individual inlet pipes 56 which extend into and terminate within the respective wings. The whirling annulus comprising the accepts fraction travels upwardly through the inlet pipes 56, and is expulsively discharged from the termini of the inlet pipes as a forceful spray. Additional advantage is obtained by positioning the inlet pipes so that the spray impinges on the interior surfaces of the wings in order to promote the breaking up of the droplets and consequently improve deaeration of the suspension.

As hereinbefore described, the cross-sectional dimensions of the several wings and the elevation of the termini of the inlet pipes should be such that the respective termini of the inlet pipes are not submerged by suspension accumulated in the wings, in order that spraying and effective deaeration of the entering stock not be interfered with. One suitable form of cleaner for use in the apparatus of the present invention is that exemplified and adapted as described in U.S. Pat. 2,717,536.

Rejects from primary cleaners 40 exit from the apex ends thereof into primary rejects branch headers 58 which extend laterally from a main primary rejects header 60. Similarly, secondary cleaners 54 receive feed from secondary feed header 412, the rejects from hydrocyclones 54 being sprayed from the apex ends thereof and flowing into secondary rejects header 62.

Primary and secondary wings 42, 44, 46 and 48 are shown to extend outwardly from the side of the cylindrical receiver 10 to slope upwardly at an angle therefrom to promote drainage of the stock into the receiver. Flexible or other adjustable connection means may be employed to join the wings to the receiver. The several wings are also shown to have their lower portions joining the receiver 10 at about the level of pond 12. Alternatively, as shown in FIGS. 4*a* and 4*b*, the sloped wings 242, 342 may join the receiver below the level of the pond, the suspension inlet pipes being so positioned as to avoid submergence of their termini from which incoming suspension is sprayed. Where, as in FIGS. 4*a* and 4*b*, the liquid-free space within the deaerating chambers 242, 342 does not freely communicate with the liquid-free space 215, 315 within the receiver, supplemental vacuum connections 252, 352 are desirably provided. If the dimensions of the individual wings in relation to the volume of stock handled in each wings is sufficiently great, no inclination of the wings is necessary as shown in FIG. 4*c*. Similarly, where there is free intercommunication between the liquid-free spaces in the receiver 442 and the deaerating chamber 410, as in FIG. 4*c*, supplemental vacuum connection to the deaerating chamber is generally unnecessary.

To promote drainage and overcome any tenency to quiescence and settling, however, an inclination of at least 8°, preferably about 12°–15°, with the horizontal is preferred, thus effecting economy of space and material and providing positive outflow or drainage of deaerated stock from the wings into the body of the receiver. It will be appreciated that greater or lesser inclination may be employed if desired. The secondary wing 48 and subsequent stage wings can be at the same or different elevations as primary wings 42, 44, 46, but to provide for machine shutdown or other occasions of substantial overflow it is preferred in the embodiment of FIGS. 1 and 2 that the outflow level of the primary and secondary (and subsequent stage) wings to the receiver not be appreciably lower than that of the surface of pond 12 or, alternatively, that the inlet pipe termini be spaced above that level, as in FIGS. 4*a*–4*c*.

The enclosures or wings 42, 44, 46 and 48 can have various cross-sectional configurations such as the cylindrical sections depicted in FIG. 2, and may suitably have a diameter of about 2½ feet and a length of about 30 feet in a system having the capacity stated earlier. In the apparatus of the example, the receiver has six primary wings and one secondary wing. Although a lesser number have been illustrated, each primary wing is intended to accommodate up to sixty cleaners 40, and the secondary wing 12 up to sixty cleaners 54, each cleaner having a capacity of about 100 gallons per minute.

As will be appreciated from the foregoing description, the deaerating chambers or wings need have a cross-sectional area which is substantially less than that of the large receivers of the prior art, which commonly have diameters of 6 to 8 feet. The smaller wing structures are more easily fabricated and require less materials which can in turn be of considerably lesser gauge while providing the necessary rigidity, in contrast to the prior art receivers. Likewise, the necessary supporting structures are simpler and less expensive to fabricate.

A particularly important consequence of accomplishing deaeration within the wings, which have a smaller diameter (or other cross-sectinoal dimension, if the wings are not cylindrical) in comparison with the receivers of the prior art, is the considerably shorter inlet pipe which can be employed to convey suspension into the chambers. In a prior art receiver having an 8-foot diameter, the inlet pipes are commonly about 8 feet in length, it being necessary to introduce the suspension to the receiver at a point above the level of any liquid collected therein, and it further being desirable to impinge the entering suspension against the upper inner surface of the receiver in order to promote atomization and hence facilitate and improve deaeration. By contrast, an exemplary deaerating chamber according to the present invention may have a diameter of about 30 inches (although size may be varied and configurations other than cylindrical may be employed), with the consequence that a considerably shorter inlet pipe is employed. The resultant decrease in length of the inlet pipe decreases frictional losses correspondingly, and less energy is required to force the stock through the inlet pipes and provide it with an optimum velocity of impact against the upper inner surface of the wings for promoting deaeration. Moreover, when both cleaning and deaeration are accomplished and the inlet pipes extend from the base or accepts outlets of the cleaners, the shorter inlet pipe increases cleaning efficiency and decreases power requirements. A lower discharge pressure is required at the accepts outlet of the cleaner, and a more uniform central liquid-free core is maintained within the cleaner and the accepts pipe, with less tendency for the whirling annulus to converge and form a constriction which can result in plugging of the reject orifice. The greater uniformity of core diameter in turn eliminates a cause of variation in the rate at which rejects are discharged from the apex end of the cleaner and thus provides greater uniformity and efficiency in cleaning. The advantage of lesser required feed pressure is enjoyed both where cleaners are employed and where the stock suspension is transmitted directly from a header through inlet pipes without the interposition of cleaning means.

Figure 3:
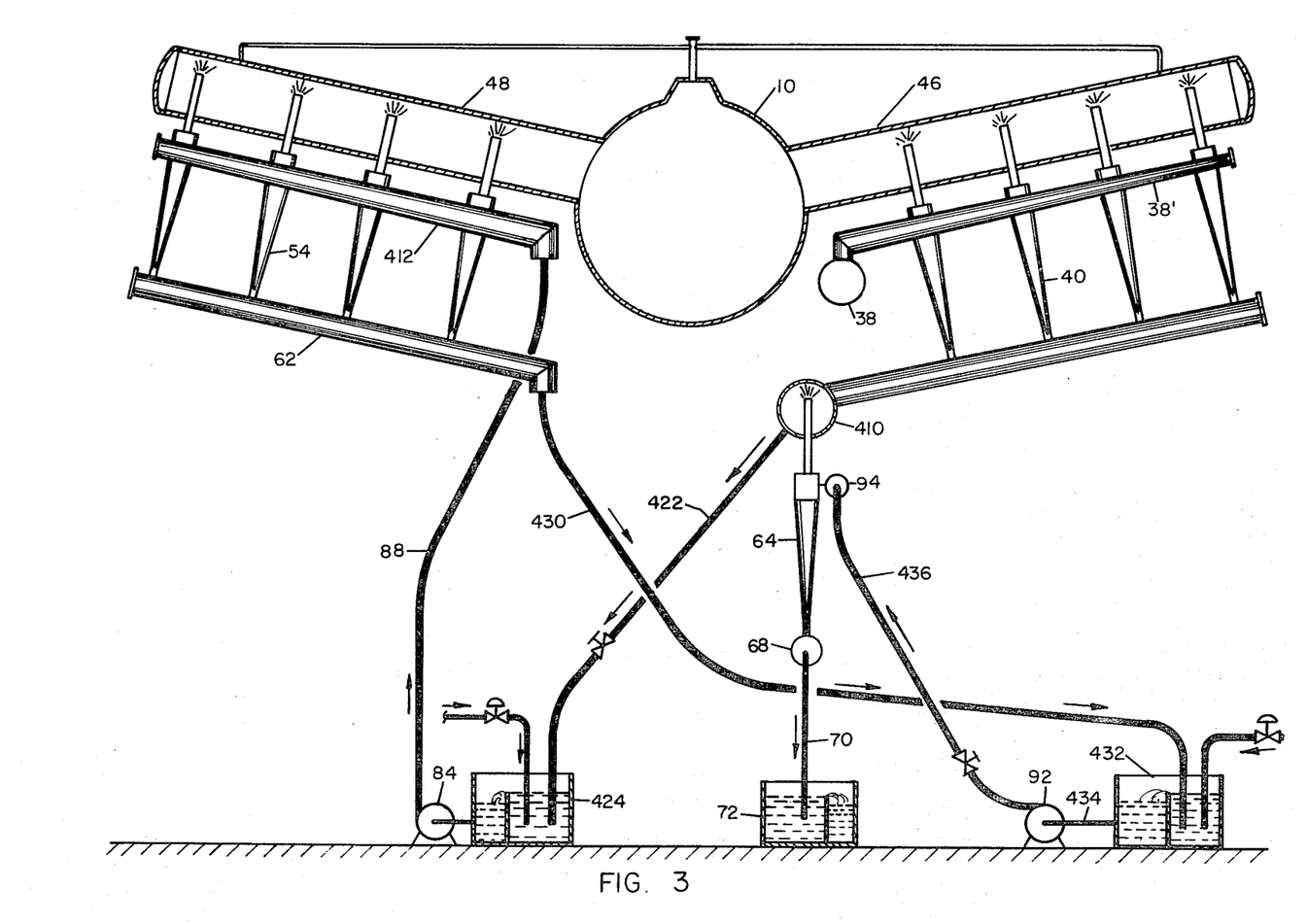
FIG. 3 is a partial schematic representation of a modified form of the apparatus shown in FIGS. 1 and 2 illustrating the discharging of subsequent stage accepts into the rejects header of a preceding cleaning stage.
Figure 4A:
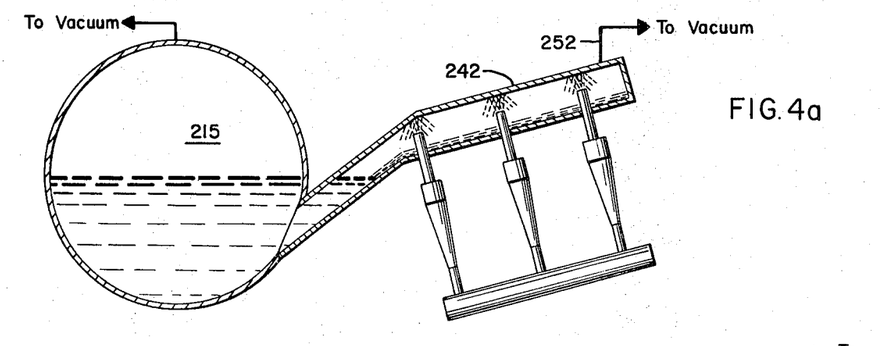
FIGS. 4a–4c illustrate alternative means of joining the deaerating chamber of wings to the receiver.
Figure 4B:
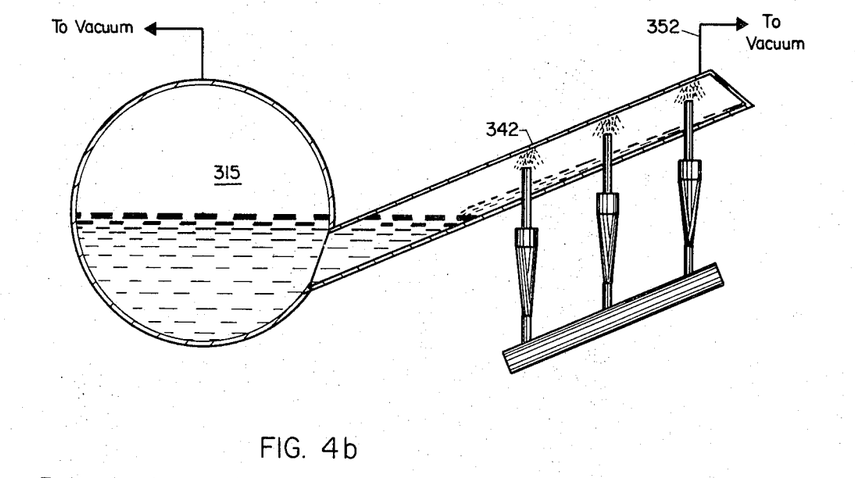
Figure 4C:
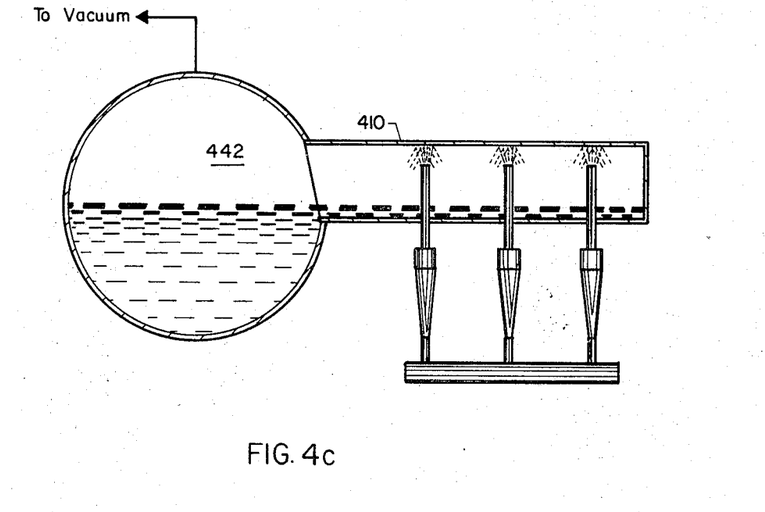

The apparatus of FIGS. 1 and 2 utilizing the advantages attending multiple-stage cleaning, also includes a tertiary stage employing cleaners 64 which process diluted secondary rejects into tertiary accepts and rejects. In the embodiment of FIG. 1, tertiary accepts are conveyed by conduit 420 to the inlet side of pump 28 supplying the primary cleaning stage. As previously described, tertiary accepts may alternatively be deaeratingly discharged through individual inlet pipes extending from the accepts outlet of each tertiary cleaner into a zone of vacuum, which may for example be a tertiary wing, the overflow compartment of the receiver, or the rejects header of a preceding cleaning stage, such as primary rejects header 410 as illustrated in FIG. 3. Tertiary rejects from hydrocyclones 64 flow into a tertiary rejects header 68 connected to the apex outlets of the hydrocyclones 64, whence the rejects flow by means of a barometric dropleg 70 to a seal box 72, exiting the latter to a waste or recovery system.

Further understanding of the improved apparatus of the present invention will be had by considering a brief description of its operation in conjunction with deaerating papermaking stock, continuing reference being made to FIGS. 1 and 2. White water (from conduit 26), fresh paper-making stock (from conduit 30), and recycle stock from overflow compartment 16 of receiver 10 through conduit 80 are drawn by pump 28 and pumped through conduit 36 into the primary feed header 38 as feed supply for the receiver, the feed passing from the primary feed header through the lateral branches 38' and into the hydrocyclones 40 as primary feed. The hydrocyclones 40 separate the feed into a rejects fraction that exits from the apex outlets of the hydrocyclones and flows into primary rejects branch headers 58. The accepts from hydrocyclones 40 exit from the base outlets and thence through the inlet pipes 56 extending upwardly into the respective primary wings 42, 44, 46, exiting from the termini of the pipes as a spray. The termini of the inlet pipes are located above the highest level at which deaerated stock can accumulate in the wings. The spray of primary "accepts" impinges against the upper inner surfaces of the primary wings and is deaerated, liberated air being drawn from the wings by means of the vacuum maintaining means. The deaerated stock flows from the deaerating chambers, collecting in the receiver 10 as a pond 12. Deaerated stock is withdrawn from pond 12 through outlet 76 and is supplied by pump 20 to the headbox 24 of the papermaking machine as furnish.

Stock, including both fresh stock and recycle stock overflowed from pond 12 to compartment 16, is supplied to the primary cleaning stage and thence to compartment 15 at a rate which is greater than that at which stock is withdrawn from pond 12 and furnished to the paper-making machine. Accordingly, pond 12 continually overflows weir 14 into overflow compartment 16 as shown. Overflow compartment 16 is provided with an outlet 78, which is connected by conduit 80 with the intake of pump 28. In the embodiment illustrated, the elevation of the receiver with respect to the surface of white water collected in the wire pit exceeds 34 feet, and conduit 80 accordingly comprises a barometric dropleg, the elevation being sufficient to overcome the vacuum in the system. If the elevation of the receiver is not sufficient to constitute conduit 80 as a barometric leg, intervening pump means (not shown) must be provided to convey overflow stock from compartment 16 to pump 28.

Primary rejects from cleaners 40 flow from the primary rejects branch headers 58 into the primary rejects header 60 and serve as feed for the secondary cleaning operation. Primary rejects header discharges through barometric leg conduit 422 into dilution box 424, into which dilution white water is added through conduit 55, for appropriate adjustment of consistency. Secondary cleaner supply pump 84 supplies feed to secondary cleaners 54, from dilution box 424 through conduits 86, 88, and secondary feed header 412.

The feed entering the secondary hydrocyclones 54 is classified therein with secondary accepts exiting from the base outlets and passing through individual inlet pipes 56, from the termini of which it exits as a spray into secondary wing 48 where the secondary accepts are deaerated. Deaerated secondary stock flows downwardly in the wing and outflows to overflow compartment 16. The secondary rejects from the hydrocyclones 54 are collected in the secondary rejects header 62 and discharge through barometric leg conduit 430 to dilution box 432, into which dilution white water is added from conduit 55. Tertiary cleaners supply pump 92 supplies feed to the tertiary cleaners 64, from the dilution box 432 through conduits 434 and 436 and header 94. The tertiary accepts are conveyed by conduit 420 to primary pump 28, and tertiary rejects discharge to sewer.

In the alternate arrangement shown in FIG. 3, the tertiary rejects exit from the hydrocyclones 64 and are collected in the tertiary rejects header 68 which is connected by means of a barometric dropleg 70 with seal box 72, thus providing means for ridding the system of non-usable waste material.

The system being maintained under vacuum, all connections are air-tight and each of the connected parts is in air-excluding relationship with the other. Suitable valving as shown may be employed at various points in the system for control purposes.

In the course of the operation of the system if it is necessary to shut down the papermaking machinery, the deaerating system can be maintained in operation. In such event, the papermaker's valve 102 is closed, and deaerated stock is no longer withdrawn through outlet 76 from pond 12. The pond then overflows at a greater rate and such overflowed stock is recycled through pump 28 back to the primary stage. The demand for fresh stock and dilution water falls to zero and additional stock accordingly does not enter the system, an equilibrium being established with the stock suspension contained in the system. That suspension is in continual flow and motion, thus avoiding settling of fiber and filler while maintaining equilibrium and making it unnecessary to seek to establish a new equilibrium upon resumption of the papermaking operation.

Figure 5A:
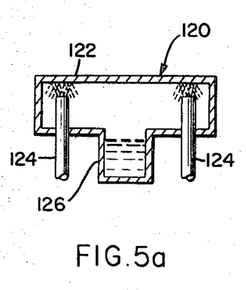
FIGS. 5a–5d depict illustrative alternative cross-sectional configurations of the deaerating chambers or wings, a terminal length only of the inlet pipes through which stock is introduced into the chambers being shown.
Figure 5B:
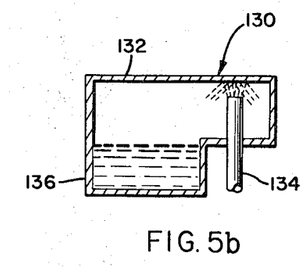
Figure 5C:
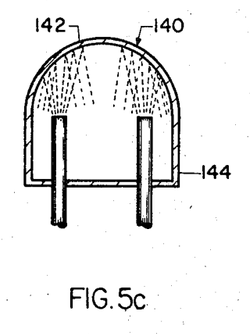
Figure 5D:
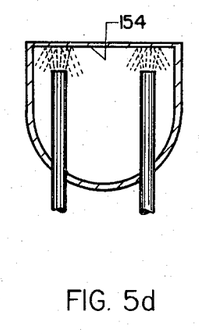

In the apparatus of FIGS. 1 and 2, the primary and secondary wings 42, 44, 46, 48 are shown as being cylindrical structures of substantially uniform diameter over their full length. However, the cross-sectional configuration of the deaerating chambers can be varied within the scope of the invention to suit particular installation requirements. Moreover, the configurations of the wings can vary within the same installation. Examples of various cross-sectional configurations are shown in FIGS. 5a–5d. Thus the wing 120 of FIG. 5a is of essentially T-shaped cross-section, the crosspiece portion 122 serving to receive the inlet pipes 124 of the cleaners associated with the wing and providing space for the deaerating operation. The stem 126 of the T serves as the channel in which the deaerated stock collects enroute to the stock receiver. FIG. 5b illustrates an embodiment of wing 130 having an essentially inverted L-shaped cross-section, the base portion 132 receiving the inlet pipe 134 and serving as the deaerating space, whereas the vertical leg portion 136 functions as the deaerated stock collection channel. FIG. 5c shows a further wing form 140 in which the enclosure includes a convexed upper segment 142 and a generally planar lower segment 144. FIG. 5d shows an inverted form of the structure of FIG. 5c and provides a flat impingement surface 154.

Figure 6A:
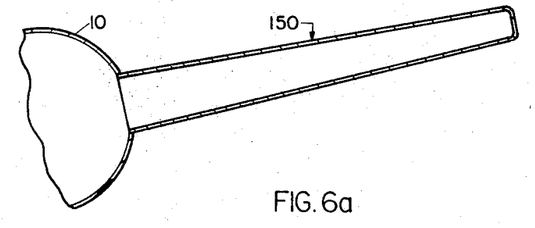
FIGS. 6a–6b illustrate alternate forms of tapered wing configuration wherein the cross-sectional area of the deaerating chambers enlarges in the direction of the stock receiver.
Figure 6B:
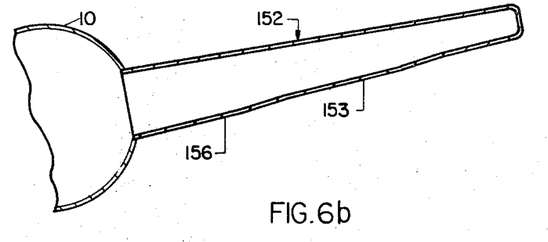

In systems where the wings are of considerable length, it may be advantageous to provide wing structures in which the cross-sectional area enlarges in the direction of the receiver. There is shown in FIG. 6a a wing 150 of essentially conical or frustoconical shape, its cross-sectional area enlarging uniformly in the direction of the receiver. The wing 152 shown in FIG. 6b enlarges non-uniformly in cross-sectional area in the direction of the receiver by provision of sections of increasing depth such as the stepped-down sections 153, 156.

Figure 7A:
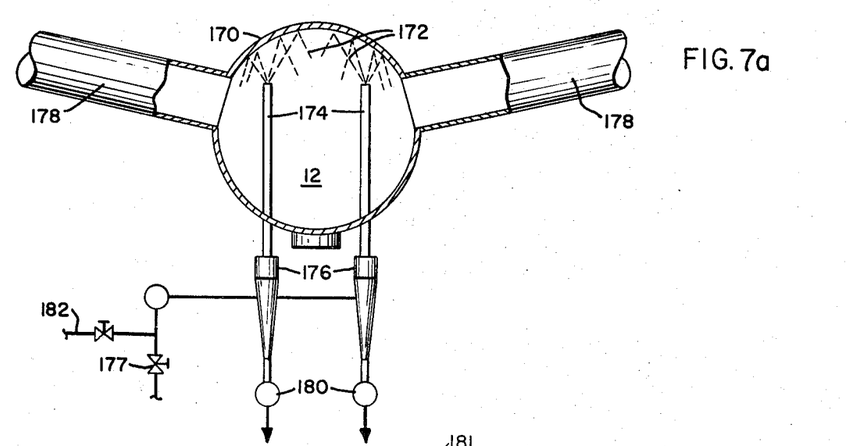
FIGS. 7a–7c are fragmentary transverse sectional views of the stock receiver showing the employment of a spray of water or stock to wash the inner upper surfaces of the receiver.
Figure 7B:
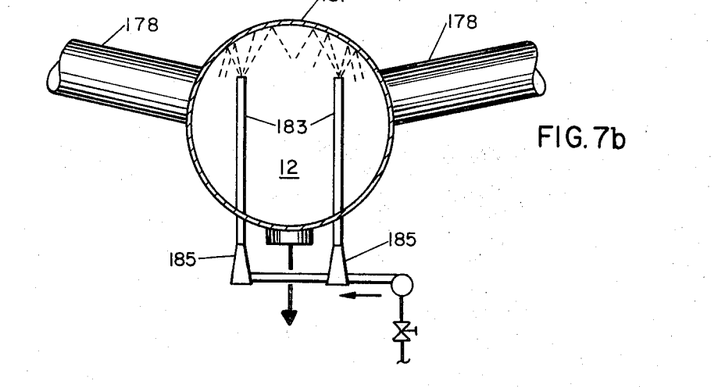
Figure 7C:
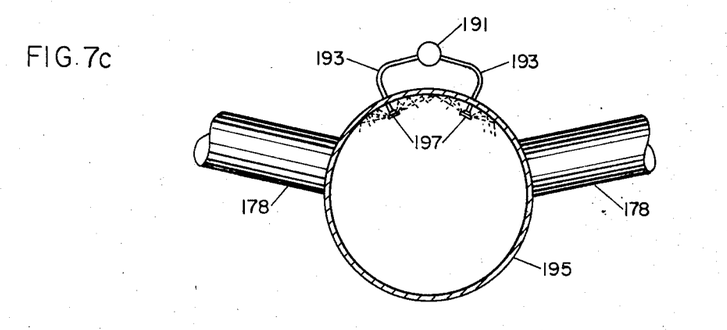

Auxialiary facilities may also be provided to wash the upper inner surfaces of the receiver in order to avoid accumulation of fiber or other solids which may be deposited thereon, as by splashing. Suitable means for this purpose are illustrated in FIGS. 7a, 7b and 7c. As seen in FIG. 7a, the receiver 170 is provided with a number of rinsing jets 172 in the form of stock feed or dilution water issuing from the inlet pipes 174 of hydrocyclones 176. If the feed to the hydrocyclones 176 is the same as that supplied to the primary wings 178, dilution of the pond 12 of deaerated stock is avoided. The relative rates of flow are such, however, that any dilution is normally inconsequential. The rejects from the hydrocyclones 176 can be directed through suitable headers 180 for further processing, as for example, in the secondary cleaning stage. The primary accepts thus introduced into the receiver wash down the upper interior surface thereof, removing substantially all of the deposited solids and preventing further buildup thereon. It is also possible to use white water or other dilution water for rinsing of the receiver interior walls, in which event the stock feed to the hydrocyclones 176 can be closed as at 177 and the white water or other dilution water delivered to the receiver through conduit 182.

The apparatus shown in FIG. 7b is the same as that shown in FIG. 7a, except that instead of employing cleaners the washing medium is introduced into the receiver 181 through suitable inlet pipes 183 which may be fitted with nozzles 185. In FIG. 7c is shown header 191 connected to the white water supply (not shown) and provided with branch conduits 193 extending through the upper walls of the receiver 195 and fitted with nozzle means 197 disposed within the receiver to direct the washing means at its inner surface.

Figure 8:
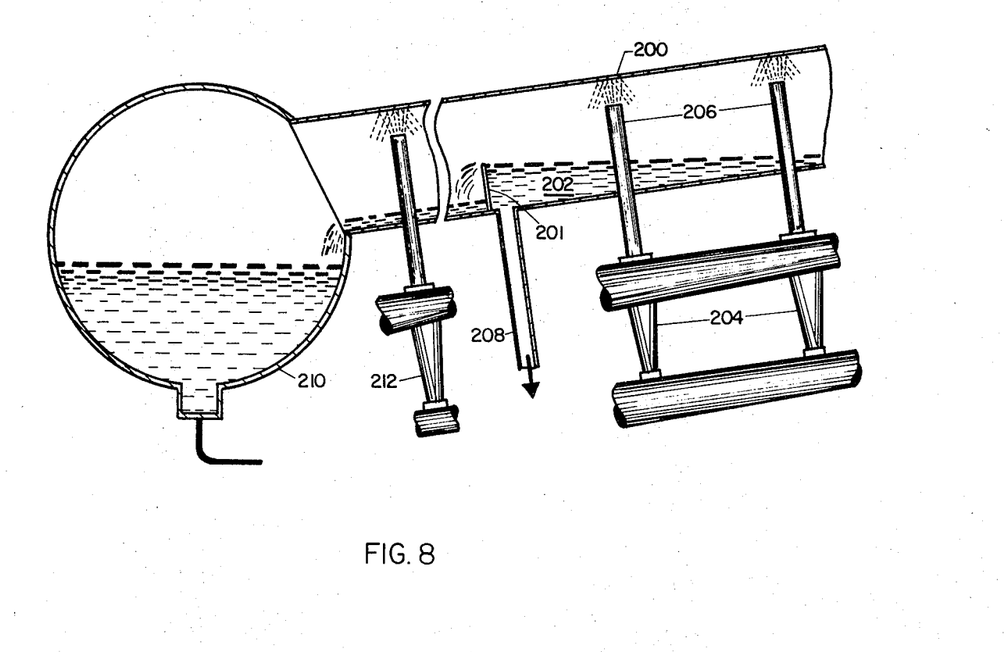
FIG. 8 is a lateral sectional view of an alternative apparatus construction illustrating the incorporation of overflow weirs within the deaerating chambers.

The apparatus of FIGS. 1 and 2 may be further modified to reduce the overall dimensions of the system stock receiver by employing the construction shown in FIG. 8. In this construction, each deaerating chamber or wing 200 is provided with a weir 201 to maintain a pond 202 of stock of an essentially constant level within the major length of the wing. In this manner primary accepts issuing from the hydrocyclones 204 and introduced into the wing through inlet pipes 206 for deaeration are collected as a pond within the wing and furnish to the papermaking machine can be drawn directly therefrom through a suitable conduit 208 connected with the underside of the wing. Individual conduits may connect the ponds maintained in the several wings with the headbox, or a common conduit may be employed for that purpose. Overflow from the pond 202 outflows from the wing into the receiver 210, and can be used as additional supply to the papermaking machine or another point of use, but more desirably is recycled to the primary cleaning stage. Secondary (and subsequent stage accepts) can also flow to the receiver, either from separate deaerating wings or, more desirably, secondary accepts from a secondary cleaning stage hydrocyclone 212 may also discharge into the wing on the side of the weir opposite the pond 202. In this manner secondary accepts and overflowed primary accepts go to the receiver for recycle to the primary cleaning stage. In this embodiment, weir or other level control means in the receiver are not necessary, but may be used, e.g., to separate tertiary accepts from the mixture of primary and secondary accepts.

Figure 9:
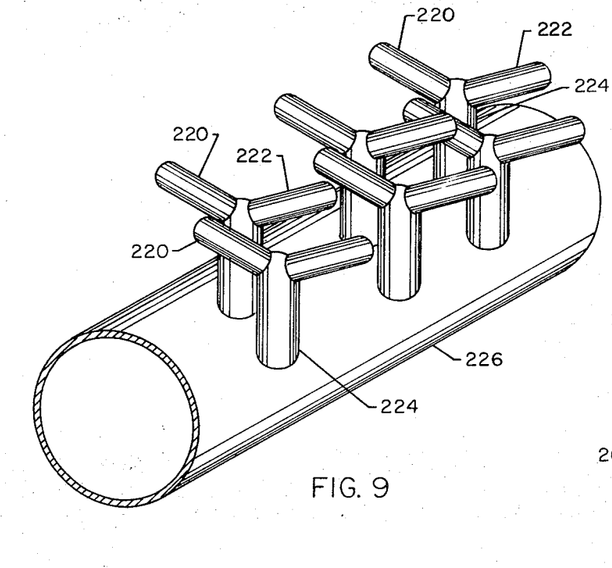
FIG. 9 is a perspective view of representative length of stock receiver illustrating a further modification of the apparatus wherein the deaerating chambers are arranged as opposed pairs in groupings extending along each side of the receiver major axis, the cleaner devices, piping, etc. associated with each chamber not being shown.
Figure 10:
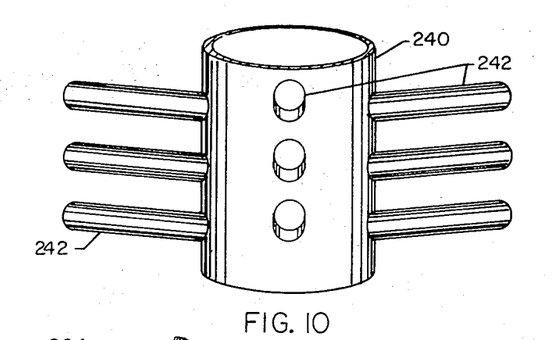
FIG. 10 is a perspective view of a stock receiver having its major axis disposed vertically with the deaerating chambers extending radially therefrom in tiers, the pumps, piping and cleaner devices associated with the unit not being shown.
Figure 11:
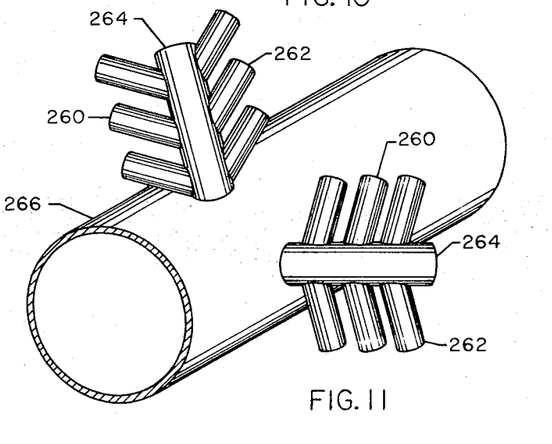
FIG. 11 is a perspective view of a further embodiment of apparatus wherein the deaerating chambers are arranged on the stock receiver in the fashion of limbs on a tree.

FIGS. 9 through 11 show further modifications in the apparatus with regard to the manner in which the deaerating chambers can be arranged on the receiver. In the embodiment of FIG. 9, the deaerating chambers are provided in the form of opposed pairs of sloping wings 220, 222, which extend outwardly from a common vertical header 224 connected with a central receiver 226. The opposed pairs of wings 220, 222, are arranged in groupings on either side of the major axis of receiver 226 with the pairs of wings in one group being axially staggered with respect to the adjacent pair of wings in the other group. The arrangement shown in FIG. 9 is particularly advantageous where lateral space limitations make it difficult to employ the arrangement of wings shown in FIGS. 1 and 2. The equipment associated with the deaerating chambers such as the inlet pipes, cleaners, feed headers, etc., is not shown in FIG. 9.

The construction illustrated in FIG. 10 shows a manner in which the deaerating chambers may be arranged on a stock receiver 240 which has its major axis disposed vertically. In this embodiment, the wings 242 are arranged radially of the stock receiver and extend outwardly upwardly therefrom in a number of vertically spaced tiers.

The arrangement of the deaerating chambers shown in FIG. 11 differs from those previously described in that the deaeration chambers 260, 262 are arranged in opposed pairs of chambers inclined with respect to common headers 264 with which they are joined, the common headers 264 in turn being joined at their lower ends to stock receiver 266 and also being inclined outwardly from a vertical plane passing through the major axis of the horizontally disposed stock receiver.

Figure 12:
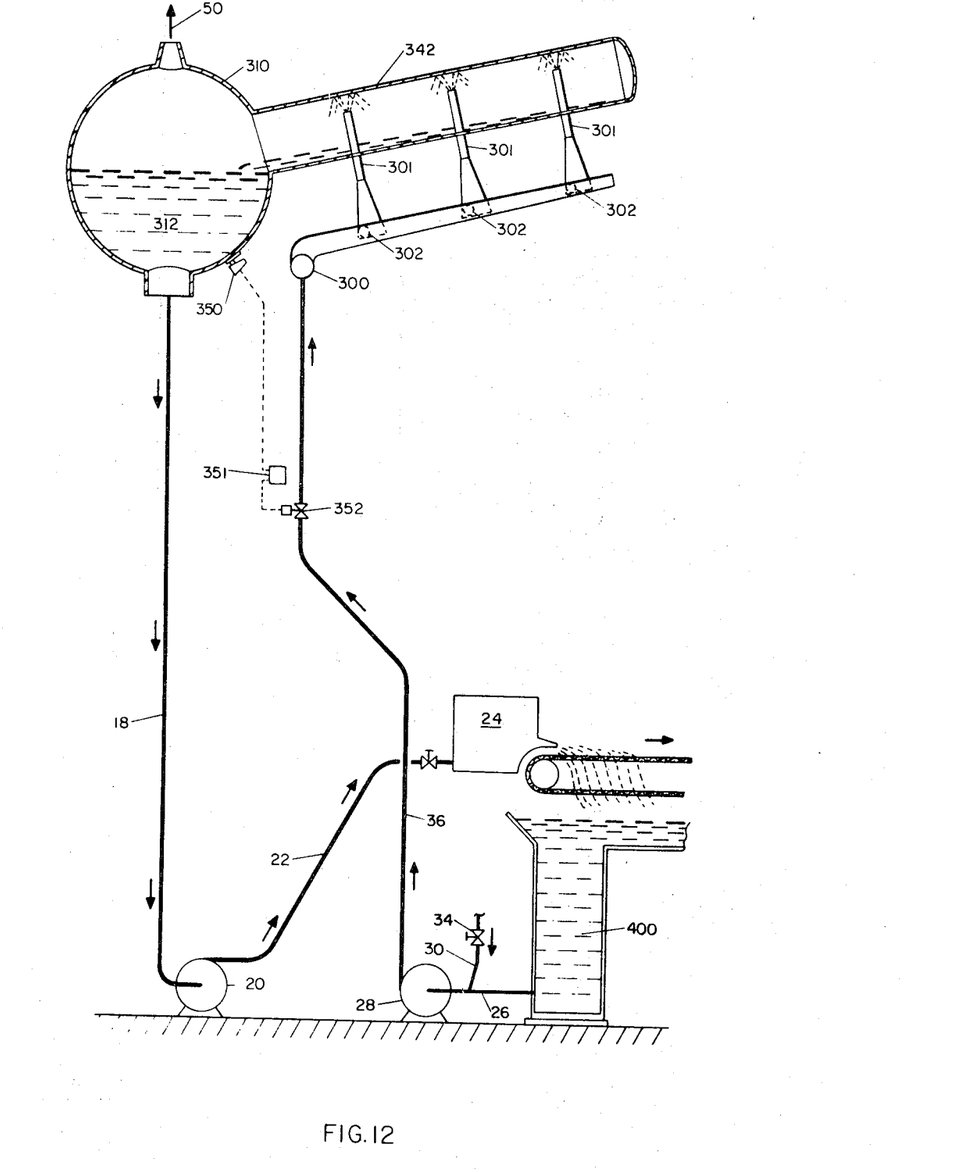
FIG. 12 is a further schematic representation of apparatus not employing cleaning means.

In the embodiment of FIGS. 1 and 2 the papermaking suspension is cleaned just prior to deaeration and the suspension is admitted to the deaerating chambers from the accepts outlets of the cleaners. As shown in FIG. 12, however, cleaners are not an essential part of the invention and the suspension to be treated may be supplied by pump 28 through conduit 36 to header 300, and thence through inlet pipe 301 fitted with spray nozzles 302 to the interior of deaerating wing 342 communicating with receiver 310. Receiver 310 does not have the weir means of receiver 10 of FIGS. 1 and 2, and if it is desired to maintain a pond 312 of deaerated suspension in receiver 310 sensing means such as differential pressure cell 350 operatively connected through control means 351 to automatic valve 352 in conduit 36 may be employed to regulate the rate of input of suspension to the system responsively to the sensed level of suspension accumulated in the receiver.

The several described embodiments are to be understood as illustrative only, and are not intended to be restrictive or limiting as to the essential character of the invention, as it may be embodied in a number of forms without departing from the spirit thereof. The scope of the invention is defined by the appended claims rather than by the description preceding them, and all changes falling therewithin or that form their functional as well as conjointly cooperative equivalents are therefore intended to be embraced thereby.

While the invention has been described with particular reference to treatment of aqueous papermaking stock suspension, it will be recognized that the apparatus and method are applicable generally to suspensions to be treated in the manner described and are not limited to papermaking suspension.

I claim:

1. Apparatus for treating an air-containing suspension, having an enclosed receiver and means for withdrawing deaerated suspension therefrom and delivering it to a point of use, in combination with a plurality of enclosed deaerating chambers extending at an upwardly directed inclination from said receiver and communicating with the interior thereof, means for sprayingly introducing an air-containing suspension into each of said chambers at a plurality of locations within each chamber and above the level of any liquid accumulated therein, and means for maintaining said chambers under a vacuum sufficient to deaerate the suspension introduced therein.

2. Apparatus according to claim 1 wherein said deaerating chambers extend from said receiver at an upwardly directed inclination of at least about 8° with the horizontal.

3. Apparatus according to calim 2 wherein said deerating chambers extend from said receiver at an upwardly directed inclination of about 12° to about 15° with the horizontal.

4. Apparatus according to claim 1 wherein the means for maintaining said chambers under vacuum is provided by evacuating means connected with an upper portion of the interior of said receiver and said upper portion of the interior of said receiver is in communication with an upper portion of each of said chambers.

5. Apparatus according to claim 1 wherein the means for maintaining said chambers under vacuum is provided by evacuating means connected directly to the interior of each of said chambers.

6. Apparatus according to claim 1 wherein the cross-sectional configuration of at least one of said deaerating chambers is circular.

7. Apparatus according to claim 1 wherein the configuration of at least one of said deaerating chambers is conical or frustro-conical and the cross-sectional area thereof increases in the direction of the receiver.

8. Apparatus according to claim 1 wherein the cross-sectional configuration of at least one of said deaerating chambers is T-shaped, the cross-piece of the T comprising the upper part of the chamber.

9. Apparatus according to claim 1 wherein the cross-sectional configuration of at least one of said deaerating chambers has the shape of an inverted L, the base of the inverted L comprising the upper part of the chamber.

10. Apparatus according to claim 1 wherein the cross-sectional configuration of at least one of said deaerating chambers has a convexed upper part and a generally planar lower part.

11. Apparatus according to claim 1 wherein the cross-sectional configuration of at least one of said deaerating chambers has a convexed lower part and a generally planar upper part.

12. Apparatus according to claim 1 wherein the cross-sectional area of the chambers enlarges in the direction of the receiver.

13. Apparatus according to claim 1 wherein the receiver is an elongated structure, the major axis of which is disposed horizontally, and the deaerating chambers extend laterally of said receiver along each side of said major axis.

14. Apparatus according to claim 1 wherein the receiver is an elongated structure the major axis of which is disposed vertically and the deaerating chambers extend radially of said receiver in vertically spaced tiers.

15. Apparatus according to claim 1 wherein the receiver is an elongated structure, the major axis of which is disposed horizontally, the deaerating chambers are grouped, and each group of chambers communicates with a header connected to said receiver.

16. Apparatus according to claim 1, including means maintaining a pond of deaerated suspension within said receiver.

17. Apparatus according to claim 1, wherein the means for sprayingly introducing the air-containing suspension into each chamber comprises a plurality of cleaners associated with each chamber, each cleaner having an accepts outlet for discharge of dirt-poor suspension, individual inlet pipes extending from the accepts outlet of each cleaner into its associated deaerating chamber above the level of any liquid accumulated therein, and means supplying suspension to each cleaner with sufficient force to expel an accepts fraction of suspension from the terminus of each inlet pipe as a spray.

18. Apparatus according to claim 17, including weir means within said receiver subdividing the receiver into a first compartment adapted to contain a pond of deaerated suspension, said weir defining one boundary of the pond, and a second compartment for receiving deaerated suspension overflowing from the first compartment when the level of the pond therein rises above said weir, a plurality of cleaning stages including a primary cleaning stage and a secondary cleaning stage, each stage comprising a plurality of cleaners having accepts outlets for discharge of dirt-poor suspension, individual inlet pipes extending from the accepts outlet of each cleaner of the primary cleaning stage into the interior of at least one primary deaerating chamber having an outlet to said first compartment of said receiver, individual inlet pipes extending from the accepts outlet of each cleaner of the secondary cleaning stage into at least one secondary deaerating chamber having an outlet to said second compartment of said receiver, means conveying rejected suspension from the primary cleaning stage to the secondary cleaning stage, means supplying suspension to each cleaning stage with sufficient force to expel an accepts fraction of suspension from the terminus of each inlet pipe as a spray, and means conveying suspension from said second compartment to said primary cleaning stage.

19. Apparatus according to claim 18 having a tertiary cleaning stage comprising at least one cleaner having an accepts outlet, individual inlet pipes connecting the accepts outlet of each cleaner of the tertiary stage to the rejects header of a preceding cleaning stage above the level of any liquid accumulated therein, and means supplying suspension to said tertiary cleaning stage with sufficient force to expel an accepts fraction of suspension from the terminus of each inlet pipe as a spray.

20. Apparatus according to claim 17 having a plurality of cleaning stages, including a primary cleaning stage, individual primary inlet pipes connecting the accepts outlets of the cleaners of the primary cleaning stage to at least one primary deaerating chamber, weir means disposed within each primary deaerating chamber between the receiver and said primary inlet pipes, means for withdrawing primary deaerated suspension from each primary deaerating chamber at a point on the side of said weir opposite said revceiver, and means for recycling suspension overflowing said weirs into the receiver to said primary cleaning stage.

21. Apparatus according to claim 20 having individual inlet pipes extending from the accepts outlets of the cleaners of at least one cleaning stage subsequent to the primary cleaning stage into said primary wings on the side of the weir opposite the primary inlet pipes.

22. Apparatus according to claim 1, including means for washing the upper interior surface of said receiver.

23. Apparatus according to claim 22, including nozzle means disposed in said reeciver and directed at its upper inner surface and means supplying a washing liquid to said nozzle means.

24. Apparatus according to claim 22, including cleaner means having accepts outlets and individual inlet pipes extending from each accepts outlet to the interior of said receiver and terminating adjacent the upper interior surface thereof, and means supplying suspension to said cleaner with sufficient force to discharge an accepts fraction thereof from the terminus of each inlet pipe as a spray.

25. A method of treating a suspension, which comprises spraying said suspension into a plurality of separate deaerating zones extending at an upwardly directed inclination from a common receiving zone at a plurality of locations within each deaerating zone and above the level of any liquid accumulated therein, maintaining each of said zones under a vacuum sufficient to deaerate the stock sprayed thereinto, conveying deaerated stock from each of said deaerating zones to said common receiving zone and conveying deaerated suspension from said receiving zone to a point of use.

26. A method of treating a suspension, which comprises spraying the accepts fraction of suspension from the termini of individual inlet pipes extending from the accepts outlets of cleaners of a primary cleaning stage into a plurality of deaerating chambers communicating with a stock receiver and extending at an upwardly directed inclination therefrom, each of said deaerating chambers having a weir disposed therein between the stock receiver and said inlet pipes, withdrawing deaerated primary suspension from the side of the weir opposite the stock receiver and conveying the withdrawn suspension to a point of use and recycling deaerated primary suspension overflowing the weir within each chamber into said stock receiver from the stock receiver to the primary cleaning stage.

27. Method of treating a suspension, which comprises spraying the accepts fraction of suspension from the termini of individual inlet pipes extending from the accepts outlets of cleaners of a primary cleaning stage into a plurality of deaerating chambers communicating with a stock receiver and extending at an upwardly directed inclination thereupon, each of said deaerating chambers having a weir disposed therein between the stock receiver and said inlet pipes, withdrawing deaerated primary suspension from the side of the weir opposite the stock receiver and conveying the withdrawn suspension to a point of use, and recycling deaerated primary suspension overflowing the weir within each chamber into said stock receiver from the stock receiver to the primary cleaning stage, said method further including the step of spraying the accepts fraction of suspension from the individual cleaners of at least one cleaning stage subsequent to the primary cleaning stage into said deaerating chambers on the side of the weir opposite the inlet pipes extending from the accepts outlets of the cleaners of the primary cleaning stage, whereby the accepts fraction from said subsequent cleaning stage and overflowed primary deaerated suspension flow together to said stock reeciver and are recycled to the primary cleaning stage.

References Cited

UNITED STATES PATENTS

| | | | |
|---|---|---|---|
| 2,717,536 | 9/1955 | Clark et al. | 209—211 |
| 2,876,860 | 3/1959 | Clark et al. | 55—177 |
| 2,931,503 | 4/1960 | Clark | 209—211 |
| 3,206,917 | 9/1965 | Kaiser et al. | 55—48 |
| 3,421,622 | 1/1969 | Wurtmann | 55—41 X |

REUBEN FRIEDMAN, Primary Examiner

RICHARD W. BURKS, Assistant Examiner

U.S. Cl. X.R.

55—48, 194, 202; 209—18, 211

PO-1050
(5/69)

UNITED STATES PATENT OFFICE
CERTIFICATE OF CORRECTION

Patent No. 3,538,680      Dated November 10, 1970

Inventor(s) Robert G. Kaiser

It is certified that error appears in the above-identified patent and that said Letters Patent are hereby corrected as shown below:

Column 2, line 39, "great" should read --greater--.
Column 2, line 52, "diameted" should read --diameter--.
Column 2, line 57, "system" should read --systems--.
Column 2, line 63, after "pond" and before "deaerated" --of has been omitted.
Column 3, line 73, "deesirable" should read --desirable--.
Column 4, line 69, delete "and".
Column 4, line 70, delete "promoting uniformity of cleaner characteristics".
Column 4, line 71, "cleaninfi" should read --cleaning--.
Column 4, line 75, "employed" should read --employment--.
Column 5, line 60, "of" should read --or--.
Column 8, line 32, "wings" should read --wing--.
Column 8, line 39, "tenency" should read --tendency--.
Column 11, line 46, "Auxialiary" should read --Auxiliary--.
Column 13, line 44, "calim" should read --claim--.
Column 15, line 6, "revceiver" should read --receiver--.
Column 15, line 17, "reeciver" should read --receiver--.
Column 16, line 29, "reeciver" should read --receiver--.

Signed and sealed this 12th day of October, 1971.

(SEAL)
Attest:

EDWARD M. FLETCHER, JR.
Attesting Officer

ROBERT GOTTSCHALK
Acting Commissioner of Patent